United States Patent [19]
Benveniste

[11] Patent Number: 5,404,574
[45] Date of Patent: Apr. 4, 1995

[54] APPARATUS AND METHOD FOR NON-REGULAR CHANNEL ASSIGNMENT IN WIRELESS COMMUNICATION NETWORKS

[75] Inventor: Mathilde Benveniste, South Orange, N.J.

[73] Assignee: AT&T Corp., Murray Hill, N.J.

[21] Appl. No.: 183,384

[22] Filed: Jan. 13, 1994

Related U.S. Application Data

[63] Continuation-in-part of Ser. No. 888,742, May 22, 1992, abandoned.

[51] Int. Cl.$^6$ .................. H04B 17/00; H04Q 7/00
[52] U.S. Cl. ........................ 455/33.1; 455/62; 455/63; 379/59
[58] Field of Search ........... 455/33.1, 62, 63, 54.1, 455/56.1, 65; 379/59

[56] References Cited

U.S. PATENT DOCUMENTS

| | | | |
|---|---|---|---|
| 3,764,915 | 10/1973 | Cox et al. | 455/33.1 |
| 4,670,906 | 6/1987 | Thro | 455/33.2 |
| 4,965,850 | 10/1990 | Schloemer | 455/33.2 |
| 5,127,100 | 6/1992 | D'Amico | 455/33.1 |
| 5,134,709 | 7/1992 | Bi et al. | 455/33.1 |

FOREIGN PATENT DOCUMENTS

WO/9010342 7/1990 WIPO.

OTHER PUBLICATIONS

"The Non-Regular Optimal Voice-Channel Assigner (NOVA) for Cellular" AT&T Bell Laboratories, A. N. Rosenberg, Mar. 1986.

"Channel Assignment in Cellular Mobile Telecommunication Systems" R. J. Pennotti, UMI Dissertation, pp. 27–31, 198–210, 1976.

"A Model for Cellular Systems Design and Evolution", M. Benveniste AT&T Bell Laboratories, pp. 1–18. Sep. 1989.

"A Prototype Model for Non-Regular Channel Asignment" by M. Benveniste, AT&T Bell Laboratories, pp. 1–18, Jan. 1990.

"An Optimization Model for Non-Regular Channel Assignment in Wireless Communications Networks", by M. Benveniste AT&T-BL Jun. 1992.

"Linear Programming Software for Personal Computers: 1990 Survey" by J. Llewellyn & R. Sharda, ORMS Today, pp. 35–47, Oct. 1990.

"New Cellular Schemes for Spectral Efficiency" by W. C. Y. Lee, IEEE Transaction on Vehicular Technology, pp. 188–192, Nov. 1987.

"On the Distribution Function and Moments of Power Sums with Log–Normal Components", by S. C. Schwartz & Y. S. Yeh, Bell Journal pp. 1441–1462, Sep. 1982.

(List continued on next page.)

Primary Examiner—Edward F. Urban
Assistant Examiner—Mark D. Wisler
Attorney, Agent, or Firm—Alfred G. Steinmetz

[57] ABSTRACT

A channel assignment system assigns channels to various cells by the optimal partitioning of the available radio frequencies into non-overlapping sets, the optimal grouping of co-user cells, and the best assignment of the former to the latter. The objective is the maximization of traffic handling capacity which, given the multitude of cells, is expressed as the maximization of a bottleneck capacity ratio. The capacity ratio for a cell is defined as the ratio of the number of radio frequencies assigned to the cell over the number of radio frequencies needed to meet blocking probability requirements. The solution to attain an optimal non-regular channel assignment is decomposed into two mathematical programs designated a Master Program and a Subprogram. These are solved iteratively with assistance from a channel set augmentation technique impelmented between solutions of the Master and Subprogram.

8 Claims, 7 Drawing Sheets

OTHER PUBLICATIONS

"The Decomposition Algoritym for Linear Programs" by G. B. Dantzig and P. Wolfe, *Econometrica*, pp. 767–778. Oct. 1961.

"Elements of Cellular Mobile Radio Systems" by W. C. Lee, *IEEE Transaction on Vehicular Technology*, pp. 48–56, May 1986.

"A Strategy for Flexible Channel Assignment in Mobile Communication Systems" *IEEE Transactions on Vehicular Technology*, by J. Tajima & K. Imamura, pp. 92–103, May 1988.

Alta Frequenza, vol. 57, No. 2, Mar. 1988, Milano, Italy, pp. 89–96, Gamst "A Resource Allocation Technique for FDMA Systems".

IEEE Transactions on Vehicular Technology, vol. 37, No. 2, May 1988, United States, pp. 92–103, Tajima et al., "A Strategy for Flexible Channel Assignment in Mobile Communication Systems".

APPARATUS AND METHOD FOR NON-REGULAR CHANNEL ASSIGNMENT IN WIRELESS COMMUNICATION NETWORKS

This application is a continuation-in-part of application Ser. No. 07/888,742, filed on May 22, 1992, now abandoned.

FIELD OF THE INVENTION

This invention relates to wireless/cellular radiotelephone systems and an apparatus and method for the assignment of radio frequency (RF) spectrum channels to the different cells within a cellular system for optimizing utilization of the available overall radio spectrum.

BACKGROUND OF THE INVENTION

The service area of a wireless communications system is partitioned into connected service domains known as cells, where radio telephone users communicate, via radio links, with the base station serving the cell. The base station (BS) is coupled to the land network. Efficient use of the available radio frequency spectrum is achieved through the reuse of the same radio frequencies in designated co-user cells that are sufficiently separated by distance so that the combined interference generated by all co-user cells is below tolerable levels. The assignment of radio frequencies to cells has been based on regularity assumptions (i.e., equalsized regularly-spaced cells with uniformly distributed traffic loads), which enable the adoption of simple rules for identifying co-user cells, and for partitioning the RF spectrum into channel sets. When the regularity assumptions do not hold—as is frequently the case in real world situations—the rules of regular channel assignment do not lead necessarily to the efficient utilization of the RF spectrum, if they can be applied at all. To optimally utilize the RF spectrum one must solve the non-regular channel assignment problem.

SUMMARY OF THE INVENTION

Therefore a channel assignment system, embodying the principles of the invention, assigns channels to various cells by the optimal partitioning of the available radio frequencies into non-overlapping sets, the optimal grouping of co-user cells, and the best assignment of the former to the latter. The objective is the maximization of traffic handling capacity which, given the multitude of cells, is expressed as the maximization of a bottleneck capacity ratio, known as the capacity factor. A capacity ratio for a cell is defined as the ratio of the number of radio frequencies assigned to the cell over the number of radio frequencies needed to meet blocking probability requirements. Given a channel assignment, the latter is fixed once the traffic loads and desired blocking are specified.

Given a group of cells of arbitrary shape, size, and/or location, the available RF spectrum is partitioned into optimal channel sets, and these channel sets are assigned to cells in an optimum way. Since traffic loads may vary from cell to cell, the assignment objective is the maximization of the cells' combined traffic-handling capacity. This objective is expressed as the maximization of the bottleneck capacity ratio that can be sustained at a satisfactory blocking rate and interference level, which is the lowest capacity ratio across all cells.

The solution of the optimal non-regular channel assignment is decomposed, according to the invention, into two mathematical programs designated as a Master Program and a Subprogram. These are solved iteratively with assistance from a channel set augmentation technique impelmented between solutions of the Master and Subprogram.

DETAILED DESCRIPTION

Figure 1:
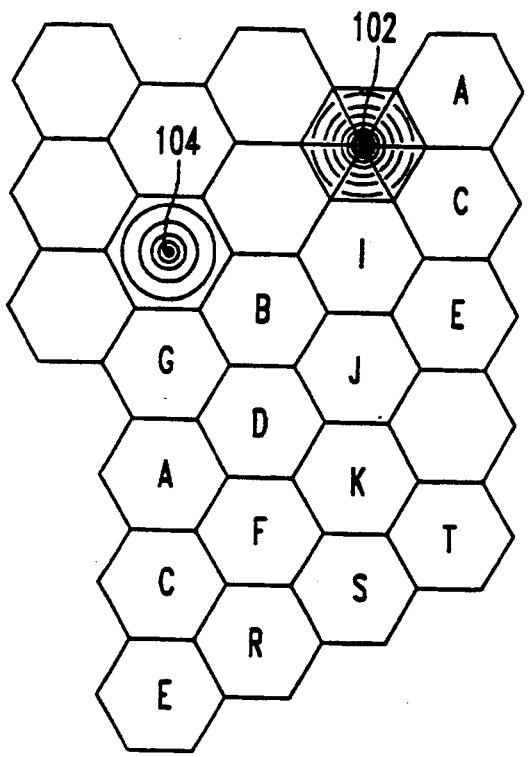
FIG. 1 is a schematic of a regular cell area layout of a wireless/cellular radiotelephone system.

A conventional regular hexagonal cell layout, of a cellular radiotelephone system, is shown in schematic form in FIG. 1. Depicting the geographical service area in terms of a hexagonal grid sets a geometric pattern that allows frequencies to be assigned in a patterned disposition that allows the reuse of these frequencies in a controlled repeatable regular assignment model. The cell areas each have specific channel sets assigned to them. Each channel set comprises a plurality of individual transmit and receive radio channels for use within the cell area. In this model, shown in FIG. 1, cells marked "A" are co-user cells and all use the same channel set. The same is true for co-user cells marked "B", "C", etc., each of which have their own assigned channel set.

Each cell is radiated by an antenna system associated with a base station (BS), that includes the radio transceivers and which are in turn connected to the public switched telephone network (PSTN) via trunk lines or suitable equivalent. Antennas 101 are either omi-directional or directional. Directional antennas 102 are used to sectorize cells into smaller angular wedge type serving areas.

Figure 2:
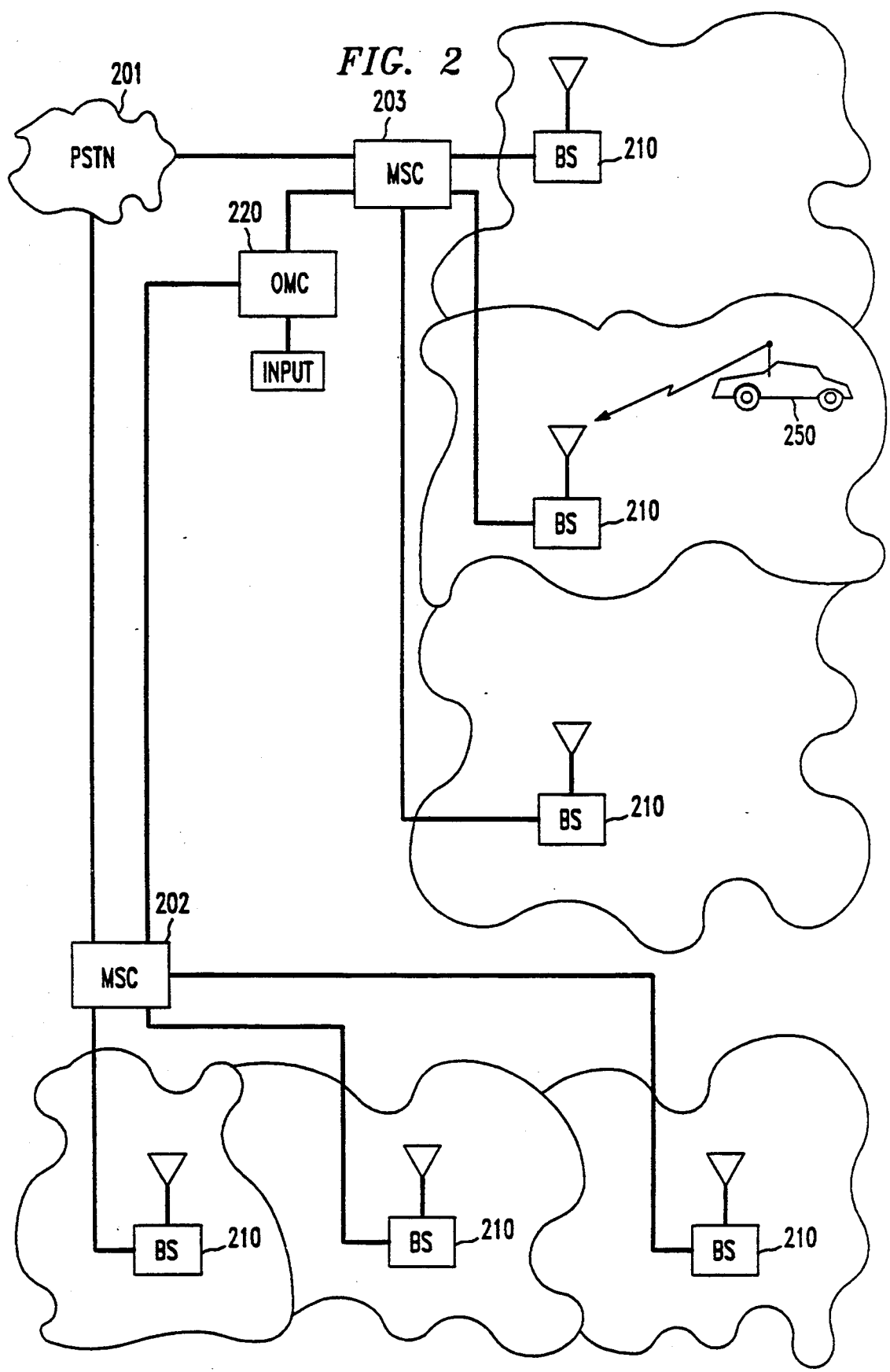
FIG. 2 is a block schematic of a wireless/cellular radiotelephone system.

A typical cellular system is shown in the block diagram of FIG. 2. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radiotelephones 250 within its cell coverage area.

An operations and management center (OMC) 220 is coupled to the MSCs 202 and 203 to control their system operation and their associated BSs 210. OMC 220 is a central control station which includes data processing equipment and input for accepting data input from data storage and real time control. This data processing arrangement may be utilized in implementing channel assignments in combination with remotely tunable radio transceivers located at the BSs.

Figure 3:
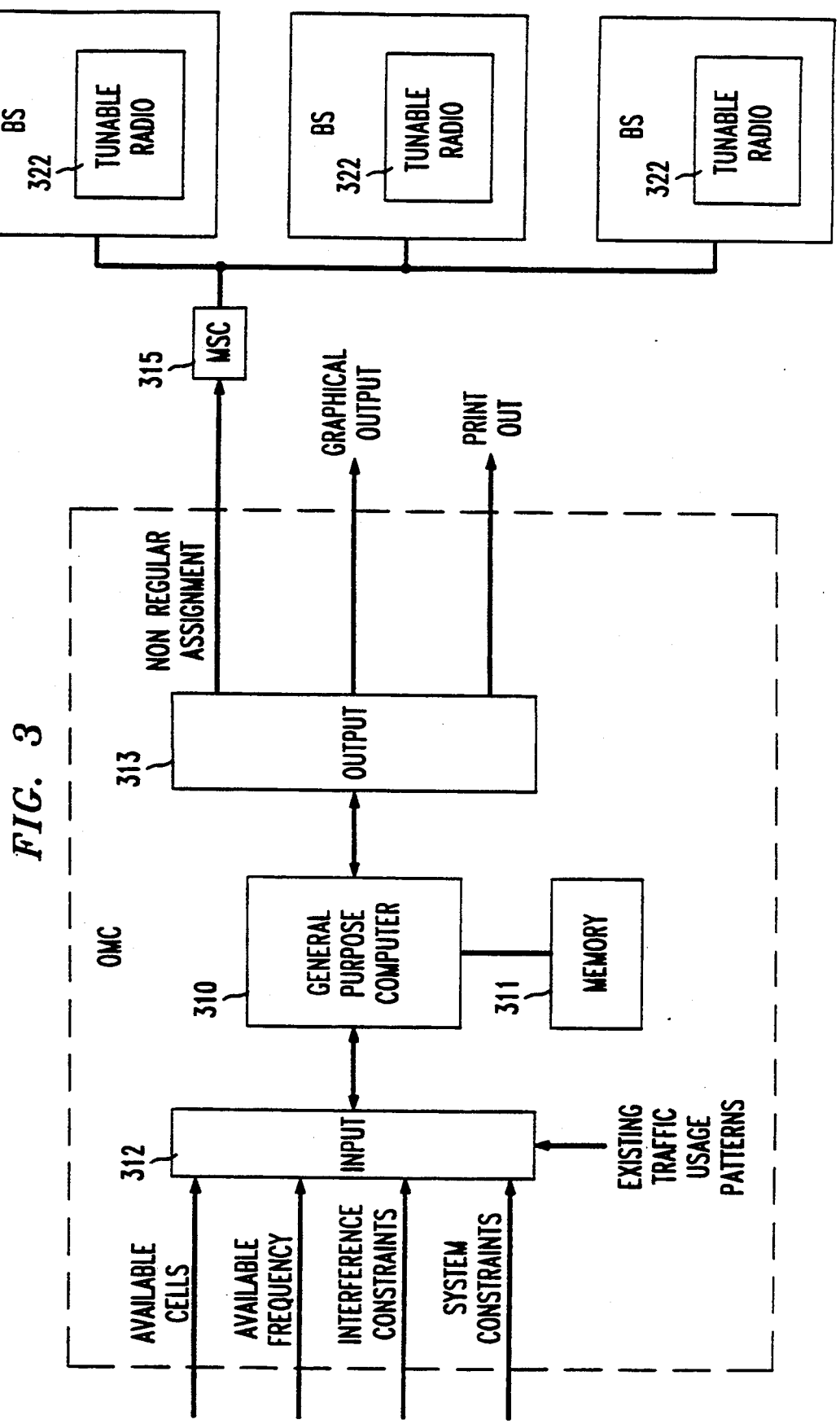
FIG. 3 is a block schematic of a data processing system for assigning radio channels to various cells of a wireless/cellular radiotelephone system.

An illustrative embodiment of data processing equipment included in the OMC for controlling the assignment and tuning of radio transceivers at the BSs is shown in block schematic form in the FIG. 3. A general purpose computer 310 has a stored program included in its memory 311. This program includes instructions for performing the non-regular assignment of radio channels to a cellular system as disclosed in further detail below. Initial input data is supplied through the input circuit 312 to the computer 310. Inputs include the available cells. The available radio frequencies are also input into the computer 310. Further inputs include interference information usually in the form of a cell-to-cell interference matrix, which defines the interference to each cell from every other cell. The inputs also include system constraints necessary for the desired channel assignment. Traffic usage patterns are supplied as an input. Traffic may be measured in real time.

In this illustrative embodiment of the invention, the assignment process is performed in the computer 310 according to the instructions contained in memory 311. The resulting non-regular assignment is output via the output 313 to the MSC 315 and is in turn forwarded to the BSs 321. The individual tunable radios 322 included in the BSs are tuned to the proper frequencies in accord with the assignment of radio channels determined by the assignment process. Added output leads permit graphical and data printouts at the OMC.

To state the above assignment problem algebraically, the following notation is utilized. Let $j = 1, \ldots, J$    index of different logical cells
(A logical cell is the portion of the coverage area of a cell served by a logical face.)
$i = 1, \ldots, J$    same as j (the combination (i, j) designates a pair of logical cells)
$y_j$    number of channels needed in logical cell j to meet blocking requirements
$N$    number of available channels
$I_{ij}$    co-channel interference contribution by logical face i to logical cell j
$S_j$    signal strength of logical face j
$T$    threshold level of the signal-to-interference ratio The unknown quantities of the problem are:

$g$    capacity factor (bottleneck capacity ratio)
$K$    number of channel sets
$N_k$    size of channel set k
$x_{kj} \begin{cases} 1 & \text{if logical cell j is covered by channel set k} \\ 0 & \text{otherwise} \end{cases}$ The channel assignment can be expressed as a mathematical programing problem of the form:

Maximize $g$

Subject to; $\sum_k x_{kj} N_k \geq y_j g$    for $j = 1, \ldots, J$    (1)

$\sum_k N_k \leq N$    (2)

$$\text{Prob}\left[ \sum_{i \neq j} I_{ij} x_{ki} \leq \frac{S_j}{T} + M(1 - x_{kj}) \right] \geq 1 - \alpha \quad (3)$$

for $j = 1, \ldots, J$    and $k = 1, \ldots, K$ $x_{kj} = 1, 0$
$N_k \geq 0$, integer where M is a large positive number.

The constraints in (1) allocate channels to logical cells in proportion to the cells' requirements. In constraint (2) the total number of assigned channels is limited to the number of channels available. Constraint (3) ensures that the ratio of signal strength to co-channel interference is above the desired threshold value with confidence level 1-$\alpha$. The above formulation of the channel assignment problem can accommodate additional constraints that would reflect a user's special needs. Examples of such constraints are discussed herein below in a discussion of the solution procedure for the basic formulation.

The above problem is a large scale nonlinear mixed-integer stochastic mathematical program. If, for example, a cellular grid has 210 logical cells (70 cell sites, with 3 logical faces per cell site), and 200 channel sets are considered, there would be 42,211 constraints and 42,200 integer variables (excluding slack variables), of which 42,000 would be binary.

In accord with the principles of the invention this problem is decomposed into two computationally tractable pans using generalized linear programming. The original problem is decomposed into two smaller problems which are solved one after the other in an iterative sequence, exchanging their respective solutions, until the optimal solution is reached. Following established convention, the two problems are called the Master Program and the Subprogram. The Master Program consists of all but the stochastic constraints in (3), which make up the Subprogram constraints.

The algebraic formulation of the Master Program and Subprogram are expressed as follows. The following expressions define the Master Program of block 420 subsequently discussed with respect to FIG. 4:

Maximize $g$

Subject to; $\sum_{\text{all available } k} x_{kj} N_k \geq y_j g$    (4)

for $j = 1, \ldots, J$ $\sum_{\text{all available } k} N_k \leq N$    (5)

$N_k \geq 0$, integer where $x_{kj}$ are constants satisfying the co-channel interference conditions. These values are supplied by the Subprogram described below.

The Subprogram contains the constraints assuring that the ratio of signal strength to co-channel interference is above a desired threshold value. Its objective coefficients are the simplex multipliers corresponding to constraints (4) of the Master Program.

The Subprogram has the following form:

Maximize $v = \sum_j \lambda_j x_j$

Subject to:

$$\text{Prob}\left[\sum_{i \neq j} I_{ij} x_i \leq \frac{S_j}{T} + M(1 - x_j)\right] \geq 1 - \alpha \quad (6)$$

for $j = 1, \ldots, J$ $x_j = 1, 0$ where $\lambda_j$ is the simplex multiplier corresponding to the $j^{th}$ constraint in (4).

The collection of channel sets included in the Master Program is comprised of all the solutions of the Subprogram. The $k^{th}$ solution of the Subprogram provides values for the binary variables $x_{kj}$. A channel set is defined in terms of the co-user cells it serves. The collection of channel sets grows with every new solution of the Subprogram, and this growth helps improve the Master Program solution. Growth in the collection of channel sets stops when the optimal solution is reached.

Figure 4:
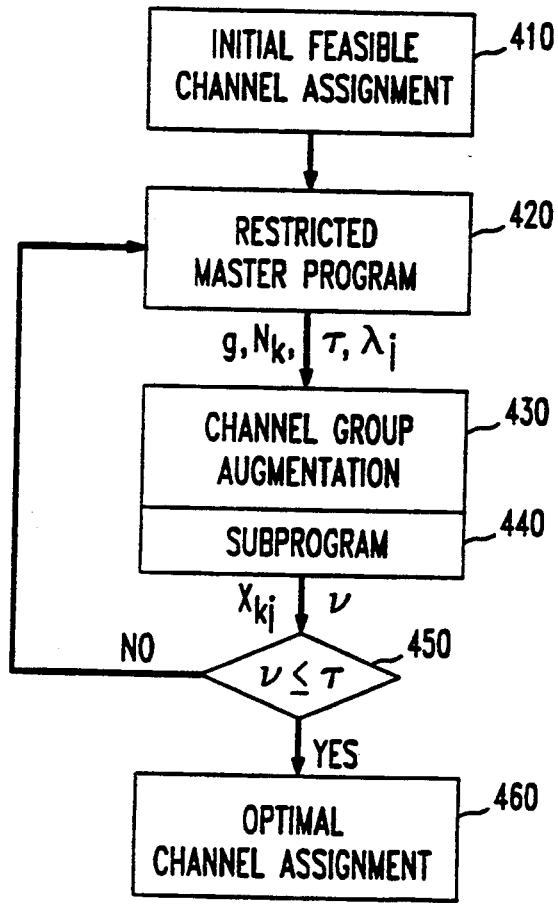
FIG. 4 is a flow process diagram of a method for assigning channels to various cells of a wireless/cellular radiotelephone system.

The overall structure of the assignment process comprising the Master Program and Subprogram is shown in the FIG. 4. The solution procedure, as shown in the flow process in FIG. 4, involves four major functions. These are: Channel Assignment Initialization (block 410), a Master Program Solution (block 420), Channel Set Augmentation, and Subprogram Solution (closely related blocks 430 and 440). In the first function, block 410, which is the initialization of the channel assignment, a feasible channel assignment is obtained before we proceed with the optimization. If the model is applied to an existing grid, the present channel assignment can serve as the initial channel assignment, provided it satisfies all system constraints. If it violates any of the constraints, it is modified by the Initial Channel Assignment algorithm, as described below, to meet all constraints.

Once an initial feasible channel assignment has been obtained, the remaining three functions are executed in an iterative sequence. First comes the solution of the Master Program in block 420, whose solution furnishes the system values of g, $N_k$, $\tau$, and $\lambda_j$. $\tau$ is a simplex multiplier corresponding to constraint (5) and $\lambda_j$ is a simplex multiplier corresponding to the jth constraint in (4). This information is used by the Channel Set Augmentation algorithm in block 430 which invokes the Subprogram Solution algorithm in block 440 several times in order to generate new channel sets.

The Channel Group Augmentation algorithm is a heuristic process that enhances solution of the problem. It revises the values of $N_k$ and $\lambda_j$, which are used in the next solution of the Subprogram. The Subprogram solution furnishes the values of $v$ and $x_{kj}$.

Once a specified number of channel sets has been generated, optimality is checked as prescribed in decision block 450. If the solution is optimal as determined in decision block 450, the algorithm terminates and the assignments are provided in block 460. Otherwise, the cycle repeats again with the solution of the restricted Master Program in block 420.

The following condition indicates optimality: Let $K-1$ be the current cycle, and let $x_{Kj}$ be the optimal solution of the new Subprogram. Let $\tau$ be the simplex multiplier corresponding to constraint (5) of the relaxed Master Program. If $$\sum_j x_{Kj} \lambda_j \leq \tau \quad (7)$$

then the current solution is optimal for the relaxed Master Program.

The solution procedure described herein is finite as the number of different channel sets is finite, and each solution of the Subprogram contributes a new channel set to the Master Program. That the channel set entering the Master Program at each cycle is new is based on the following observation. The simplex multipliers of the relaxed Master Program at cycle $K-1$ satisfy the conditions: (5)

$$\sum_j x_{kj} \lambda_j - \tau \leq 0 \quad \text{for } k = 1, \ldots, K - 1 \quad (8)$$

If the new Subprogram solution $x_{Kj}$ is added to the Master Program, it cannot meet the condition in (7), for that would lead to the termination of the process. Since it violates the requirement in (7) it cannot be identical to any of the $K-1$ solutions encountered previously, by condition (8). Hence, $x_{Kj}$ represents a new channel set. Given that the number of cells in a grid is finite, the number of distinct cell groupings that represent different channel sets is also finite. Hence, the solution procedure is finite.

The solution procedure must start with a feasible channel assignment, that is a channel assignment that covers all cells and meets the channel availability constraint and co-channel interference constraints. For an existing cellular grid, the channel assignment in place may serve as the initial channel assignment, provided it is feasible. If the existing channel assignment is not feasible (infeasibility would arise typically from the violation of the interference constraints), or if there is no existing channel assignment, it is necessary to generate an initial feasible channel assignment.

Figure 5:
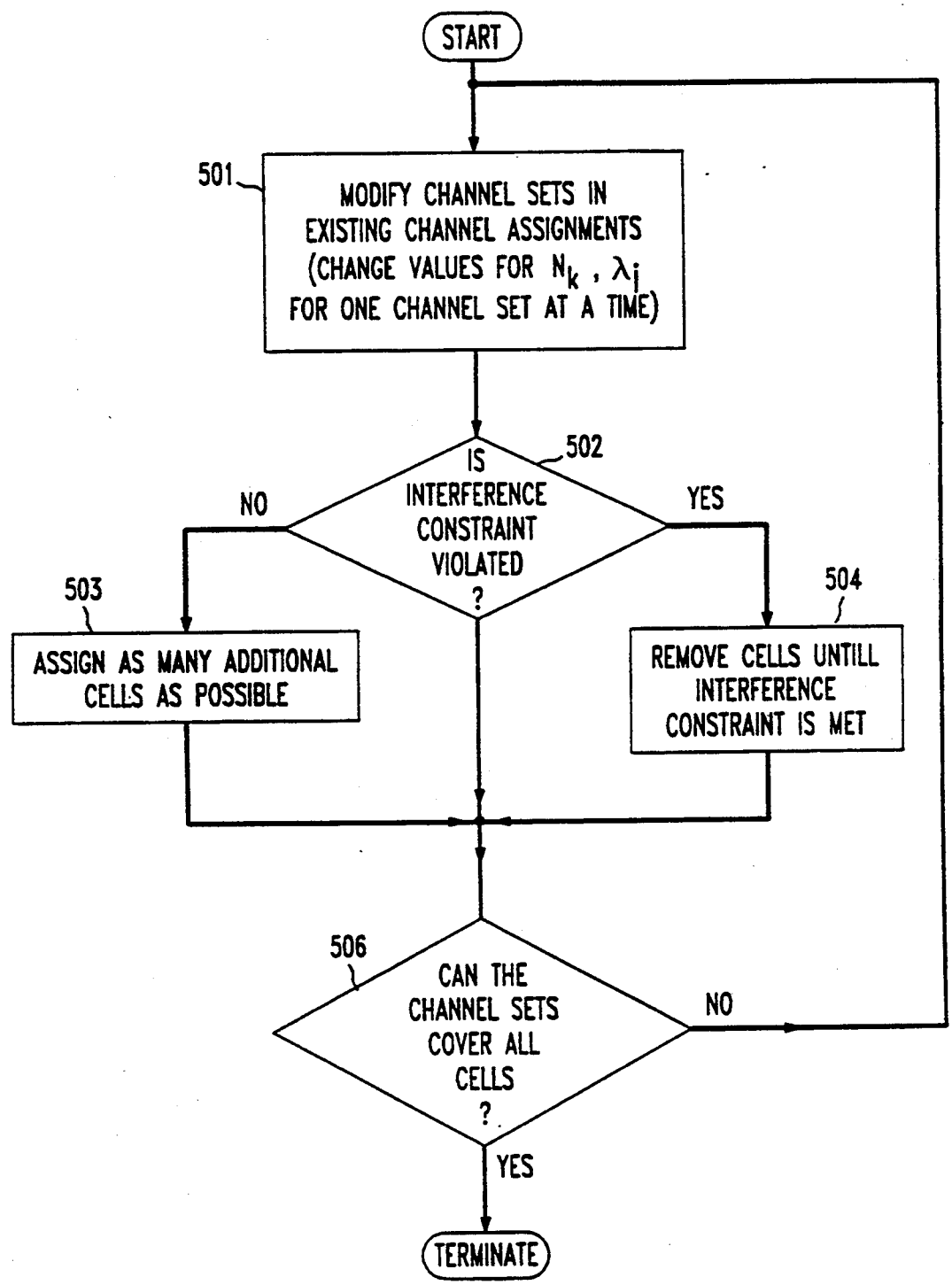
FIG. 5 is a flow process diagram of a method for making initial feasible channel assignments.

The method for deriving an initial channel assignment is based on a variation of the Channel Group Augmentation algorithm. In the most general case, as shown in FIG. 5, the existing channel assignment violates the interference constraints. In this case, Channel Assignment Initialization consists of two phases. In Phase I we modify (Block 507) the channel sets in the existing channel assignment, one at a time by changing values for $N_k$ and $\lambda_j$. If a channel set violates the interference constraint (decision Block 502), cells are removed (Block 504) until it satisfies the interference constraint. If the interference constraint is met by an existing channel set, the algorithm will assign as many additional cells as possible (Block 505), provided that the interference constraint is satisfied. If the resulting channel sets cannot cover all cells, the second phase is implemented. In Phase II additional channel sets are generated until all cells are covered (Block 506).

Both phases employ the Channel Set Augmentation algorithm. They differ in terms of the initial values used for $\lambda_j$. In Phase I, $\lambda_j$ equals 1 for all cells j covered by the existing channel set, and zero for the remaining cells. In Phase II, $\lambda_j$ is computed by the equation (10) disclosed herein below.

The Master Program is a linear program involving the integer variables $N_k$, which assume values ranging from 0 to N—the number of available frequencies, a number which is normally between 300 and 400. Given the magnitude of the integer variables, one can obtain near-optimal solutions to this mixed-integer linear program by solving the relaxed linear program without the integer requirements as per Block 601 in FIG. 6. For the purposes of channel assignment, integer solutions must be provided.

Figure 6:
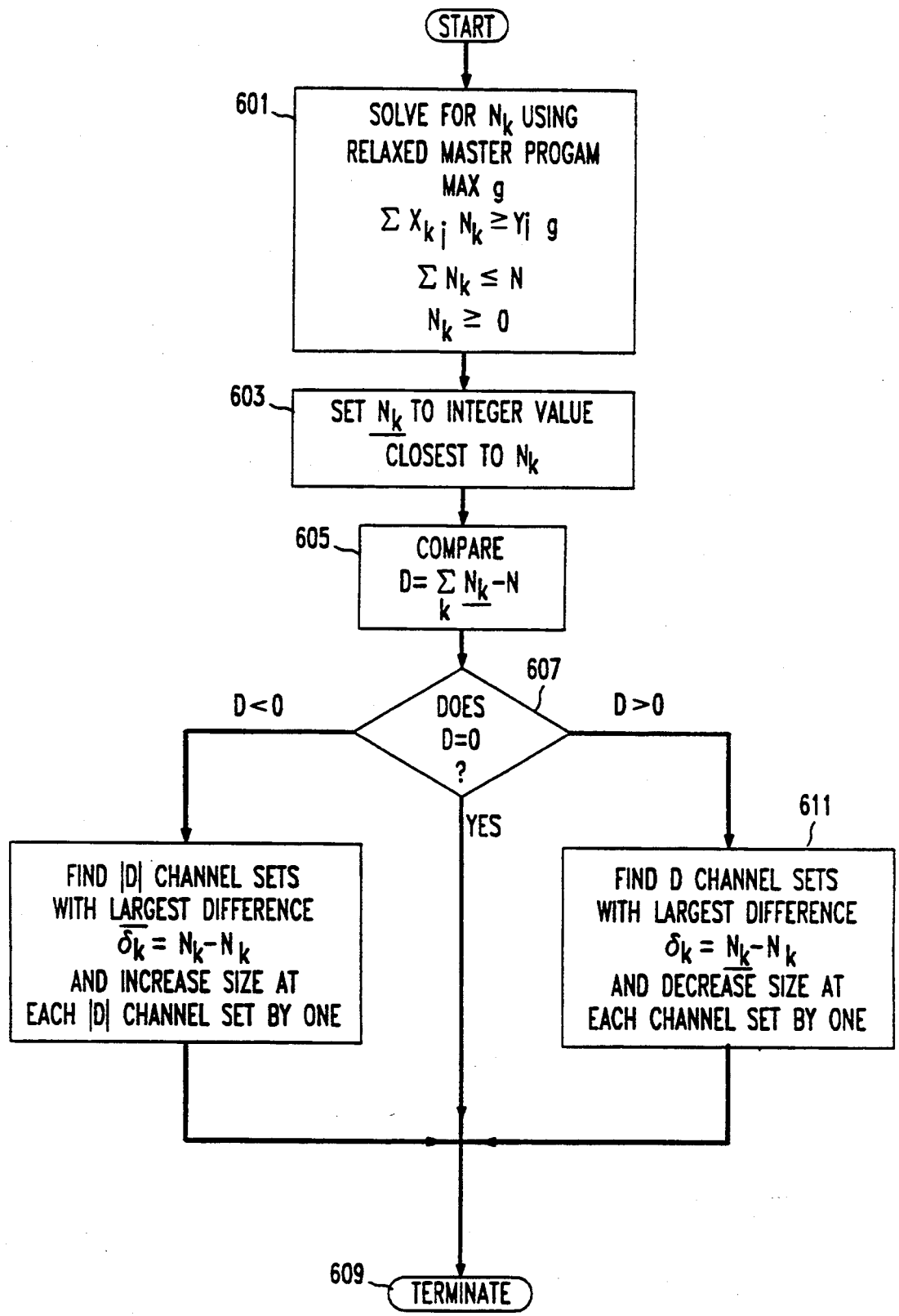
FIG. 6 is a flow process diagram of a method for providing an integer solution for the Master Program.

The algorithm yielding an integer solution to the Master Program shown in FIG. 6 uses the fact that the optimal channel assignment will use all of the N available channels. Given an optimal solution to the relaxed problem (the linear program without the integer requirements), the algorithm starts by making the channel set sizes equal to the integers closest to the relaxed solution (Block 601). It terminates if the integer set sizes add up to N (Blocks 605,607, 609). If not, it increases (or decreases) by 1 the sizes of the channel sets with the greatest positive (or negative) deviation from the optimal non-integer value (Blocks 611,615). The steps of the algorithm are shown in the FIG. 6 and are described below in detail.

The term $N_k$ denotes the channel set sizes in the optimal solution, and by $\underline{N}_k$ their closest integers. The procedure for obtaining an integer solution to the Master Program is outlined in FIG. 5 as follows:

Step 1  Set $\underline{N}_k$ equal to the integer closest to $N_k$. (Block 603)

Step 2  Compute the difference $D = \sum_k \underline{N}_k - N$. (Block 605)

If $D = 0$, terminate (Block 607). Otherwise go to Step 3.
Step 3  If $D < 0$, go to Step 5. Otherwise go to Step 4. (Block 607)
Step 4  Find D channel sets with the largest difference
$\delta_k = \underline{N}_k - N_k$
Decrease the size of each of the D channel sets by 1. Terminate. (Blocks 611, 613)
Step 5  Find $|D|$ channel sets with the largest difference
$\delta_k = N_k - \underline{N}_k$.
Increase the size of each of the $|D|$ channel sets by 1. Terminate. (Blocks 615, 617)

It is easy to verify that, given a non-negative solution to the relaxed linear program, the resulting integer solution will also be non-negative.

Once the complexity caused by the integer constraints has been removed, the solution of the Master Program becomes straightforward. Standard linear programming software can be used. By linear programming standards, the relaxed Master Program is a relatively small linear program, having a number of constraints equal to one plus the number of logical cells in the grid, and number of variables equal to one plus the number of channel groups. It is expected that a large grid would have no more than 500 logical cells. Seven hundred and fifty channel sets would more than exceed the number needed to yield an optimal solution.

The number of cycles of the Master Program is reduced by generating lists of channel sets with the channel group augmentation heuristic. One of the factors contributing to the computational effort in mathematical programming decomposition is the repeated solution of the Master Program. Since the optimal channel assignment is derived from the last Master Program solution, and all previous Master Programs serve only to generate a list of desirable candidate channel sets, generating a larger number of candidates at each cycle would tend to reduce the number of Master Program solutions while still yielding an optimal solution. Therefore, between any two consecutive solutions of the Master Program, the method used generates several new channel sets. The number to be generated is specified by the user.

The criterion used in generating new channel sets is that they must have the potential to improve the Master Program objective value. The first channel set generated after the solution of the $K^{th}$ Master Program has this potential since it has a negative reduced cost by condition (7). In order to obtain heuristically additional channel sets with a negative reduced cost, the simplex multiplier $\lambda_j$ is needed. Typically, $\lambda_j$ is supplied by the solution of the Master Program. Since our aim is to generate more than one channel set between consecutive solutions of the Master Program, it is necessary to revise the $\lambda_j$ values before each Subprogram solution without re-solving the Master Program.

The revision of $\lambda_j$ is based on properties that would hold if the Master Program were solved. They are derived from the following Complementary Slackness conditions defined by equation (9):

$$\lambda_j \left( \sum_{k=1}^{K} x_{kj} N_k - y_j g \right) = 0 \quad \text{for } j = 1, \ldots, J \tag{9}$$

A consequence of the above conditions is that the simplex multiplier $\lambda_j$, which is required to be non-negative, will be positive only if the corresponding primal constraint in equation (1) is binding or, equivalently, whenever the capacity ratio of cell j equals the grid capacity factor. We refer to such a cell as a binding cell.

The condition of equation (9) is employed to update the $\lambda_j$ values of binding cells as follows. A new channel set K, derived from the last Subprogram solution, will receive in the next iteration a portion of the available channels. This implies that if set K covers cell j, cell j will typically not be binding in the next iteration. By equation (9), the corresponding simplex multiplier $\lambda_j$ would become zero. Hence, the following revision rule is used:

$$\lambda_j = \begin{cases} 0 & \text{if } x_{Kj} = 1 \\ \text{unchanged} & \text{if } x_{Kj} = 0 \end{cases} \tag{10}$$

This revision causes channel sets generated by subsequent solutions of the Subprogram to favor binding cells that were not covered by the last channel set, as they will have positive $\lambda_j$ values.

The above revision rules deal with the binding cells as they become non-binding. Rules are needed also for the cells that are not binding in the Master Program solution but, as new channel sets are added, may become binding. Such cells should be covered by subsequent channel sets. With $\lambda_j$ assigned zero value by equation (9), however, they do not have a chance, unless $\lambda_j$ is updated. An alternative way is to communicate to the Subprogram the binding status of a cell by handing over the new channel set sizes $N_k$. The Subprogram considers the binding status of a cell together with simplex multiplier $\lambda_j$ values in deriving a new channel set.

There are several ways to revise $N_k$. In this implementation of the algorithm we assume that the new channel set K will receive one $K^{th}$ of the available channels, while the size of the existing $K-1$ channel sets will be adjusted accordingly. That is, $$N_K = \frac{N}{K} \tag{11}$$

If the existing channel sets had size $N'_k$, their new sizes will be $$N_k = N'_k \frac{(K-1)}{K} \quad \text{for } k = 1, \ldots, K-1 \tag{12}$$

Figure 7:
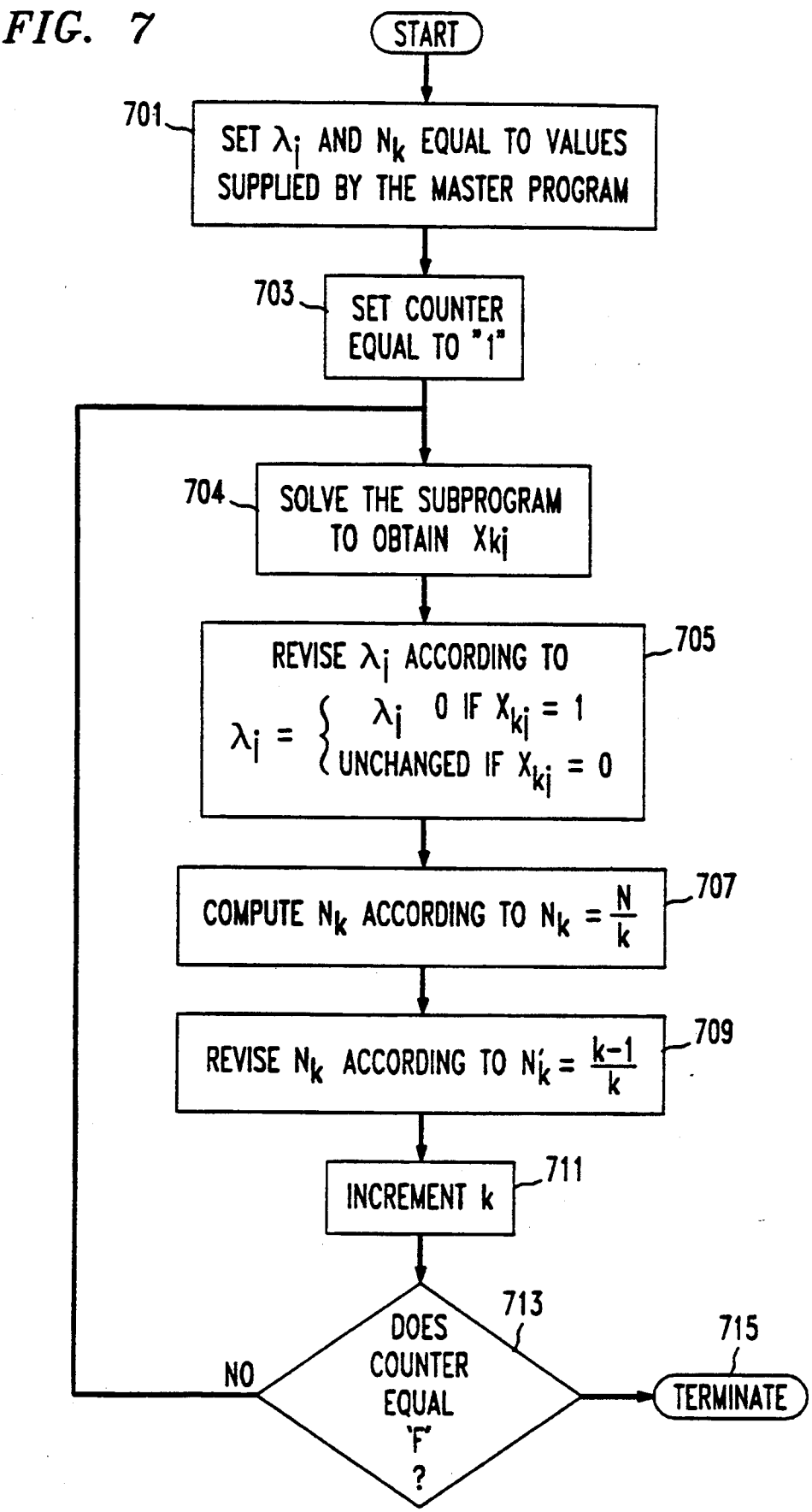
FIG. 7 is a flow process diagram of a method for channel set augmentation.

The algorithm for generating F new channel sets is shown in flow form in FIG. 7.

| | |
|---|---|
| Step 1 | Set $\lambda_j$ and $N_k$ equal to the values obtained by solving the Master Program. (Block 701) |
| Step 2 | Repeat Steps 3 through 6, F times. (Blocks 702, 713) |
| Step 3 | Solve the Subprogram to obtain $x_{kj}$. (Block 704) |
| Step 4 | Revise $\lambda_j$ by equation (10). (Block 705) |
| Step 5 | Compute $N_K$ by equation (11) (Block 709), and revise $N_k$ for $k = 1, \ldots, K-1$ by equation (12). (Block 711) |
| Step 6 | Increment K. (Block 711) |

Given the difficulty of pursuing a globally optimal solution method, we have devised an efficient heuristic algorithm for the solution of the Subprogram. It constructs a solution by selecting among the cells in the grid those that will maximize the Subprogram objective value without violating the interference constraints of equation (6). Such a set is constructed by adding one cell at a time, giving priority to the cells with the greatest $\lambda_j$ value. A cell can be added to the set if it does not interfere with the cells already in the set. For cells with equal $\lambda_j$ values the order in which cells are considered is important because the inclusion of one cell might preempt, through the interference it generates, more cells than another. Preference is given to cells with low preemptive potential. The pre-emptive potential would change at each step, as new cells are added to the set. Therefore, the criterion function used for including a cell in the solution is updated after the addition of each cell.

The algorithm logic can be described as follows. At each step, the cells are partitioned into three subsets. The set C, which consists of the cells included in the solution (i.e., $x_j=1$); the set $\overline{C}$, which consists of the cells excluded from the solution (i.e., $x_j=0$); and the set U, which consists of the cells whose fate has yet not been determined. At the start of the algorithm, U contains all the cells, and C and $\overline{C}$ are empty. At each step a member of U is placed in C. Its inclusion in the solution may pre-empt other members of U from inclusion. The pre-empted members of U are moved to $\overline{C}$. The algorithm terminates when U becomes empty.

Among cells with equal $\lambda_j$ values, the cell to be moved from U to C is chosen based on its potential to block other members of U from entering C. There are several ways to measure this potential. In the implementation described in this paper we define the pre-emptive potential function $p_j$ as the inverse of the "slack" $a_j$ in the interference constraint in equation (6), which measures the margin for additional contributions to the interference experienced in cell j.

$$p_j = \frac{1}{a_j} \tag{13}$$

The solution of the Subprogram is expanded to include cells with zero $\lambda_j$. This is necessary in order to deal with the non-binding cells that become binding as more channel sets are generated. Moreover, the inclusion of the largest possible number of cells in the solution of the Subprogram is desirable for the increased system planning flexibility it affords. Hence, cells are chosen in order of descending value of the following criterion function $f_j$:

$$f_j = \lambda_j - \epsilon \left( \frac{\sum_{k=1}^{K} x_{kj} N_k}{y_j} \right) - \epsilon^2 p_j \tag{14}$$

where K is the last channel set generated, and $\epsilon$ is a very small positive number.

Given a sufficiently small value for $\epsilon$, the cells with positive $\lambda_j$ values will be given priority. The remaining cells will be considered only when all cells with positive $\lambda_j$ have been considered. Among cells with positive and equal $\lambda_j$ values, the choice of a cell to be included in set C is based on the pre-emptive potential $p_j$ since, according to condition (9), the capacity ratio in the second term of (14) is the same for all such cells—it equals the grid capacity factor. For cells with zero $\lambda_j$ values, the capacity ratio dominates the choice of a cell to be included into C.

Figure 8:
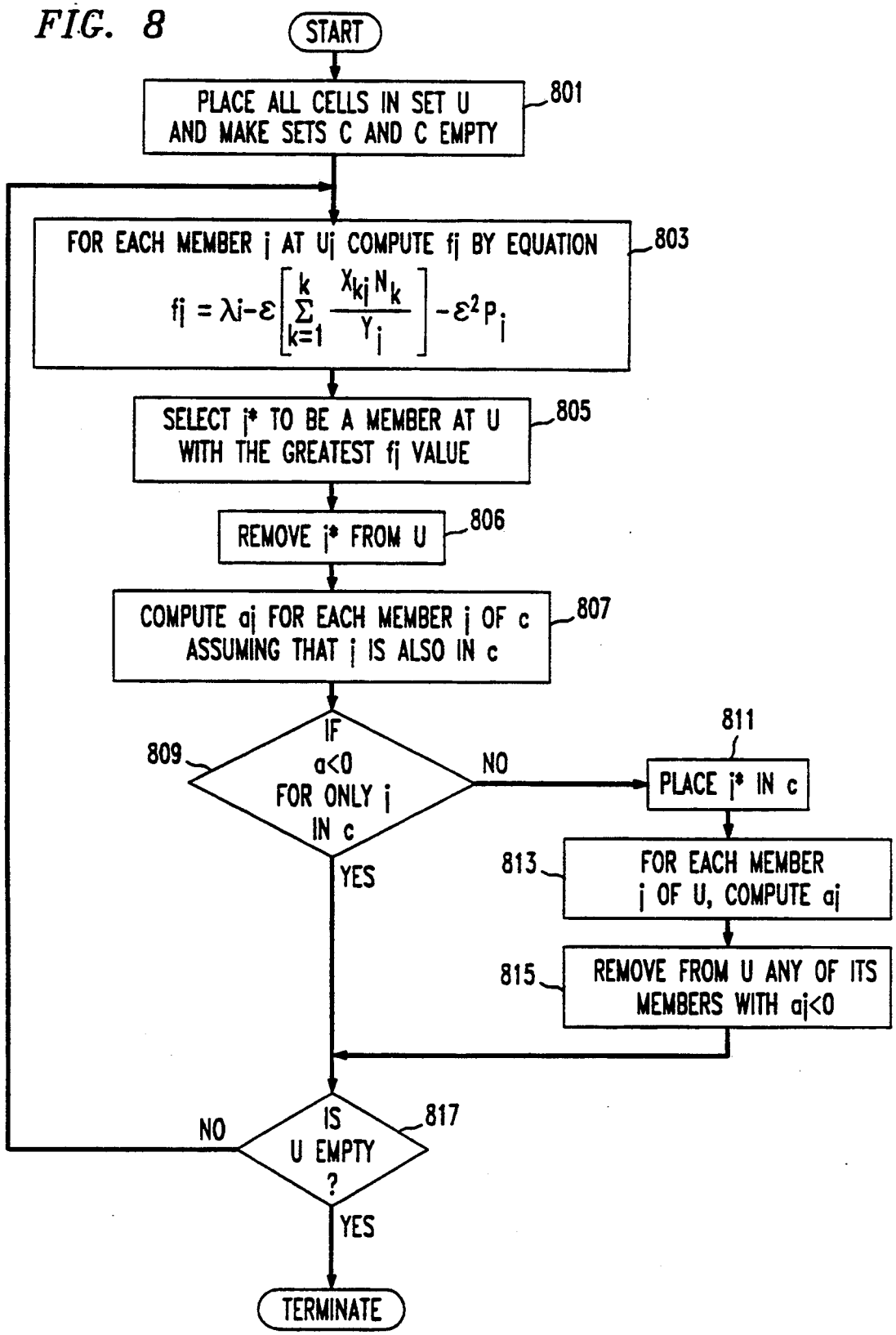
FIG. 8 is a flow process diagram of a method for solution of the Subprogram.

The algorithm for the solution of the Subprogram is shown in flow process form in FIG. 8.

| | |
|---|---|
| Step 1 | Place all cells in set U, and make sets C and $\overline{C}$ empty. (block 801) |
| Step 2 | For each member j of U, compute $f_j$ by equation (14). (block 803) |
| Step 3 | Select j* to be the member of U with the greatest $f_j$ value. (block 805) Remove j* from U. (block 806) |
| Step 4 | Compute $a_j$ for each member j of C assuming that j* (block 807) is also in C. |
| Step 5 | If $a_j < 0$ for any j in C, place j* in $\overline{C}$ and go to Step 8. (block 809) Otherwise, place j* in C (block 811) and go to Step 6. |
| Step 6 | For each member j of U compute $a_j$. (block 813) |
| Step 7 | Remove from U any of its members j with $a_j < 0$ and place them in $\overline{C}$. (block 815) |
| Step 8 | If U is empty, terminate. (block 817) Otherwise, go to Step 2. |

The calculation of the pre-emptive potential $p_j$ in the solution of the Subprogram, discussed above, involves the interference constraint slack $a_j$, which measures the margin for additional contributions to the interference experienced in cell j. The slack will vary with the composition of C, the collection of cells covered by the channel set.

To compute the slack $a_j$ we convert the probability statement of equation (6) into an equivalent deterministic constraint for each cell j in U, the collection of undetermined cells. The constraint in equation (6) can be written as follows:

$$\text{Prob}\left[ \frac{S_j}{\sum_{i \neq j, i \in C} I_{ij}} \geq T \right] \geq 1 - \alpha \quad \text{for } j \in U \tag{15}$$

To write the above as an equivalent deterministic inequality, we need to know the probability distribution of the signal-to-interference ratio. Let Y be the value of this ratio, expressed in decibels. That is, $$Y = 10 \log_{10}\left(\frac{S_j}{\sum_{i \neq j, \epsilon C} I_{ij}}\right) \quad (16)$$

Following other treatments, we assume that Y is normally distributed. Let $\mu_y$ and $\sigma^2_y$ be the mean and variance of Y, respectively, and let R be the signal-to-interference ratio threshold value T expressed in decibels. Equation (15) can be written as follows:

$$\text{Prob}[Y \geq R] = 1 - \text{Prob}\left[z \leq \frac{R - \mu_Y}{\sigma_Y}\right] \geq 1 - \alpha \quad (17)$$

for $j \in U$ where z is a normal random variable. The equivalent deterministic constraint is the following:

$$\mu_y + z_\alpha \sigma_y \geq R \quad (18)$$

where $z_\alpha$ is the $\alpha$-quantile of a normal random variable. $a_j$ is the slack variable of the above inequality. Therefore, $$a_j = \mu_y + z_\alpha \sigma_y - R \quad (19)$$

The values of $\mu_y$ and $\sigma_y$ depend on the composition of set C. They are computed using the assumption that the signals of all antenna faces, when expressed in decibels, are independent normally distributed random variables and that the cumulative interference experienced in cell j is also normally distributed, when expressed in decibels [9]. Let
where $$L = 10 \log_{10}\left(\sum_{i \neq j, \epsilon C} I_{ij}\right) \quad (21)$$

$$P = 10 \log_{10} S_j \quad (22)$$

If $\lambda_L$ the mean of the cumulative interfence L in cell j, expressed in decibels $\sigma_L^2$ the variance of L $\mu_p$ the mean of the power signal P in cell j, is expressed in decibels as $\sigma_p^2$ the variance of P then, the mean and variance of Y are given by:

$$\mu_y = E(Y) = E(P) - E(L) = \mu_p - \mu_L \quad (23)$$

$$\sigma_y^2 = Var(Y) = Var(P) + Var(L) = \sigma_p^2 + \sigma_L^2. \quad (24)$$

$\mu_p$ and $\sigma_p^2$ are specified as input to the model. $\mu_L$ and $\sigma_L^2$, which vary with the composition of the set C, are computed in each step of the Subprogram Solution algorithm by a power-summing procedure.

I claim:

1. In a wireless communications system having service areas partitioned into a plurality of substantially contiguous cells, a method of assigning radio channels to the cells:

comprising the steps of:

determining the available cells and frequencies:

determining interference and system constraints for the cells:

determining existing traffic patterns for the cells;

inputting the cells, frequencies, interference and system constraints, including blocking requirements, and traffic into a computing device;

programming the computing device to optimize the assignment of radio channel sets to the cells wherein the improvement comprises;

decomposing a calculation for optimizing the radio channel set assignment into a Master Program and a Subprogram, initially solving the Master Program in order to determine values for a capacity factor, channel set sizes, a first simplex multiplier vector corresponding to the channel assignment constraints for each cell, and a second simplex multiplier vector corresponding to the radio channels availability constraint; wherein the capacity factor represents a bottle neck capacity ratio of a number of radio frequencies assigned to a cell over the number of radio frequencies needed to meet blocking requirements;

solving the Subprogram to generate additional channel sets using output values from the Master Program which include channel set sizes and the simplex multiplier vector; by heuristically providing new values of channel set sizes and the first simplex multiplier vector to replace for calculation purposes these values for values initially determined by the initially solving of the master program, and resolving the Subprogram to generate further channel sets;

resolving the Master Program using channel sets determined by solving and resolving the subprogram to maximize the capacity factor and for selecting channel sets and for determining new sizes of the channel set;

checking the resulting assignments for optimality by evaluating the second simplex multiplier;

terminating when optimality is achieved;

transmitting the assignments to the respective base stations; and tuning the radios of the base stations to the appropriate frequencies.

2. In a wireless communications system a having service areas partitioned into a plurality of substantially contiguous cells a method of assigning radio channels to the cells as recited in claim 1;

comprising the further steps of:

converting a channel group size provided by the Master Program to its nearest integer value;

determining if the integer group sizes add up to the number of available channels;

if the integer group sizes exceed the number of available channels reduce the sizes of selected channel groups by one until the integer group sizes add up to the number of available channels;

if the integer group sizes are less than the number of available channels increase the sizes of selected channel groups by one until the integer group sizes add up to the number of available channels; and if the number of integer group sizes equal the number of available channels accepting the channel group size to be integerized.

3. In a wireless communication system a having service areas partitioned into a plurality of substantially contiguous cells a method of assigning radio channels to the cells as recited in claim 1;

wherein the steps of solving the Subprogram include the added steps of:

placing all cells in a set U and initializing sets C and C to be empty, computing a criterion function $f_j$ for each member j of set U, selecting $aj^*$ having the greatest $f_j$ value to be a member of U, removing $j^*$ from U and adding it to C, computing the term $a_j$ for each member j assuming $J^*$ is in C, placing $j^*$ in C if $a_j$ is less than zero and placing $j^*$ in C if $a_j$ is equal to or greater than zero, computing $a_j$ for each member j of U when $a_j$ is equal to or greater than zero from the previous step, and removing members j from U where $a_j$ is less than zero from U and placing them in C, and terminating when U is empty.

4. In a wireless telephone communication system, having a plurality of substantially contiguous cells; apparatus for assigning radio channels to cells comprising:

input apparatus for storing in a memory information concerning available radio channel constraints, cell identifications, interference and system assignment constraints and existing traffic patterns for the cells;

a computer including programmed instructions for developing radio channel assignments in response to data stored in the memory;

means for assigning to the cells the radio channel sets developed by the computer to enable radio transceivers at the cells to tune to frequencies in accordance with the channel assignments;

wherein the programmed instructions carry out the process of:

selecting a first collection of channel sets;

for the first collection of channel sets, determining values for a capacity factor representing a bottleneck capacity ratio of a number of radio frequencies assigned to a cell over the number of radio frequencies needed to meet blocking requirements, set sizes, a first simplex multiplier vector corresponding to channel assignment constraints for each cell, and a second simplex multiplier corresponding to the available radio channels constraint;

generating additional channel sets to improve the capacity factor using values obtained from the step of determining;

heuristically computing new values of channel set sizes and new values of simplex multiplier vectors;

repeating the step of generating a selected a selected number of times each time including the heuristically selected new values in the generating process; and returning to the step of determining as long as a selected criteria is not met.

5. In a wireless telephone communication system, as claimed in claim 4;

wherein the step of selecting a channel set includes assigning a channel set to a cell using conventional regularity assumptions and complying with channel availability and interference constraints.

6. In a wireless telephone communication system, as claimed in claim 4;

wherein the step of determining a value for a capacity factor includes defining a limiting capacity ratio of assigned channels to channels needed to meet blocking requirements.

7. In a wireless telephone communication system, as claimed in claim 4;

a channel set size is determined its an integer value.

8. In a wireless communication system in which a service area is partitioned into a plurality of non-regular contiguous cells; a method of dynamically altering assignments of radio channels to the cells comprising the steps of:

initially determining interference constraints, system constraints and available channel frequencies and entering the information into a memory of a computer;

storing an existing assignment of radio channels into the memory;

determining existing traffic patterns of mobile radio telephone usage within the service area and entering the existing traffic pattern into the memory of the computer;

developing an improved assignment of radio channels to the cells; and communicating the improved assignment of radio channels to the cells, causing radio transceivers at the cells to operate at frequencies representing the improved channel assignments;

wherein the improvement comprises programming the computer to solve a calculation for optimizing radio channel assignments to the cells by decomposing the calculation into a Master Program and a Subprogram, and by:

initially solving the Master Program to determine values for a capacity factor representing a ratio of radio frequencies assigned to a cell to radio frequencies needed to meet blocking requirements, channel set sizes, a first simplex multiplier vector corresponding to interference and system constraints for each cell and a second simplex multiplier vector corresponding to available channel frequencies;

solving the Subprogram to generate additional channel sets using output values from the Master Program;

heuristically generating new values for use by the Subprogram of the first simplex multiplier vector and of channel set sizes; and resolving the Subprogram using the new values to generate further channel sets;

resolving the Master Program using results of the Subprogram for selecting additional channel sets to maximize the capacity factor;

checking resulting channel set sizes of the master program for optimally; and terminating when optimality is achieved.

* * * * *